United States Patent Office 3,300,519
Patented Jan. 24, 1967

3,300,519
6β-THIOCYANATO PREGNANE DERIVATIVES
Taichiro Komeno, Osaka, Japan, assignor to
Shionogi & Co., Ltd., Osaka, Japan
No Drawing. Filed Dec. 30, 1963, Ser. No. 334,631
Claims priority, application Japan, Jan. 9, 1963,
38/885
1 Claim. (Cl. 260—397.4)

The present invention relates to 6β-thiocyanato-4-pregnene-3,20-dione and an intermediate therefor.

The said 6β-thiocyanato-4-pregnene-3,20-dione is represented by the formula:

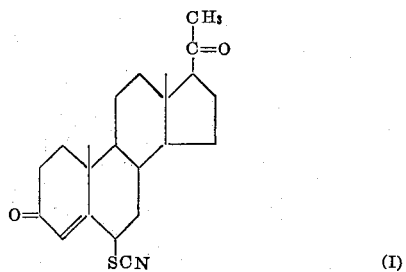

It is useful as an artificial hormonic substance, i.e. a progestational agent.

The objective 6β-thiocyanato-4-pregnene-3,20-dione can be prepared from a known steroid, i.e. 3,3,20,20-bisethylenedioxy-5α,6α-epoxypregnane [Bowers et al.: Tetrahedron, vol. 7, p. 138 (1959)] according to the following scheme:

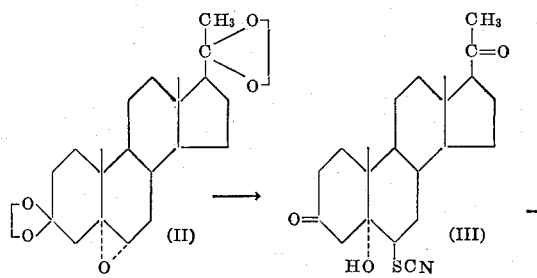

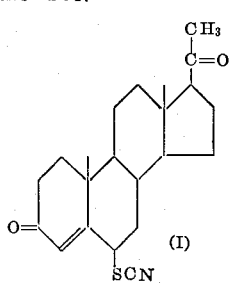

The starting 3,3,20,20 - bisethylenedioxy - 5α,6α-epoxypregnane (II) is first subjected to fission of the epoxy linkage. The fission may be accomplished by treating the starting steroid (II) with thiocyanic acid, prepared from potassium thiocyanate and phosphoric acid, in an inert organic solvent (e.g. ether, chloroform, dichloromethane) at room temperature (i.e. 15 to 30° C.).

The resulting product, i.e. 5α-hydroxy-6β-thiocyanatopregnane-3,20-dione (III), is then subjected to dehydration. The dehydration may be carried out by treating the intermediate (III) with thionyl chloride in the presence of an organic base (e.g. pyridine, picoline, triethylamine) while cooling with ice.

The thus produced 6β-thiocyanato-4-pregnene-3,20-dione is useful as a progestational agent. For instance when administered to immature female rabbits at a dose of 20 milligrams, it produced statistically significant increase of uterine weight.

The following examples set forth illustratively presently-preferred embodiments of the present invention.

Example 1

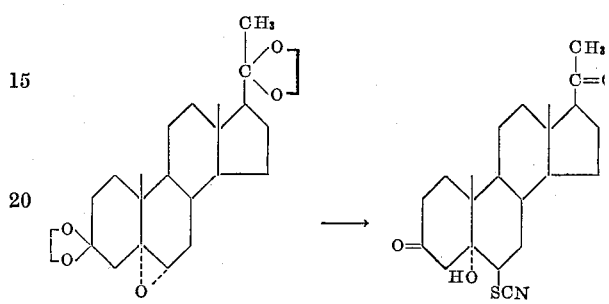

To a solution of potassium thiocyanate (30 g.) in water (20 ml.), there are added ether (120 ml.) and phosphoric acid (50 g.) whereby the produced thiocyanic acid is retained in the ether layer. The ether layer is separated and dried over anhydrous sodium sulfate and then calcium chloride. A solution of 3,3,20,20-bisethylenedioxy-5α,6α-epoxypregnane (4.63 g.) in chloroform (40 ml.) is added thereto, and the resultant mixture is allowed to stand at room temperature (15 to 30° C.) for 48 hours. The reaction mixture is washed with dilute sodium carbonate solution and water in order, dried and the solvent evaporated. The residue is dissolved in 80% acetic acid (100 ml.) and heated on a water bath for 30 minutes. Water is added to the resultant mixture. The precipitated crystals are collected by filtration, washed with water, dried and recrystallized from a mixture of chloroform and methanol to give a 5α-hydroxy-6β-thiocyanatopregnane-3,20-dione (3.93 g.) as crystals melting at 213 to 215° C (decomp.). $[\alpha]_D^{23.5}$—$58.5 \pm 2°$ (c=1.018 in chloroform).

IR: $\nu_{max.}^{Nujol}$ 3302, 2146, 1720, 1689 cm.$^{-1}$.

Analysis.—Calcd. for $C_{22}H_{31}O_3NS$: C, 67.83; H, 8.02; N, 3.60; S, 8,23. Found: C, 68.14; H, 8.11; N, 3.70; S 8.02.

Example 2

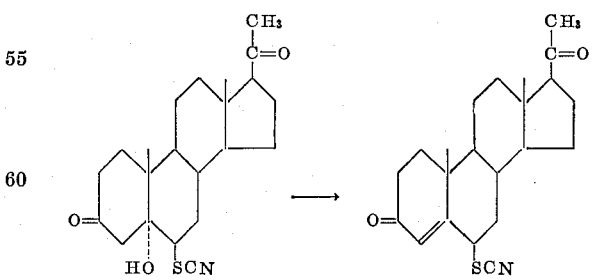

To a solution of 5α-hydroxy-6β-thiocyanatopregnane-3,20-dione (1.13 g.) in pyridine (15 ml.), there is added thionyl chloride (800 mg.) under stirring while cooling with ice and sodium chloride, and the resultant mixture is stirred for 30 minutes. A mixture of water and ice is added to the reaction mixture. The separated crystals are collected by filtration, washed with water, dried and re crystallized from a mixture of acetone and hexane to give 6β-thiocyanato-4-pregnene-3,20-dione (858 mg.) as crystals melting at 165 to 167° C. $[\alpha]_D^{23} + 125.6 \pm 2°$ (c=1.013 in chloroform).

IR: $\nu_{max.}^{CHCl_3}$ 2166, 1700, 1680, 1612 cm.$^{-1}$.

*Analysis.*—Calcd. for $C_{22}H_{29}O_2NS$: C, 71.12; H, 7.87; N, 3.77; S, 8.63. Found: C, 71.29; H, 7.98; N, 3.76; S, 8.73.

What is claimed is:
5α-hydroxy-6β-thiocyanatopregnane-3,20-dione.

References Cited by the Examiner

Tori, et al., "Chemistry and Industry," September 1963, page 1527 relied on.

LEWIS GOTTS, *Primary Examiner.*

E. L. ROBERTS, *Examiner.*